E. J. BENEDICT AND M. C. FROST.
RESILIENT TIRE.
APPLICATION FILED JUNE 3, 1919.

1,346,695. Patented July 13, 1920.

Inventor
E. J. Benedict and
M. C. Frost
By Lancaster & Allwine
Attorneys

UNITED STATES PATENT OFFICE.

EMORY J. BENEDICT AND MOLLIE C. FROST, OF MEMPHIS, TENNESSEE.

RESILIENT TIRE.

1,346,695.                     Specification of Letters Patent.        Patented July 13, 1920.

Application filed June 3, 1919. Serial No. 301,383.

*To all whom it may concern:*

Be it known that we, EMORY J. BENEDICT and MOLLIE C. FROST, citizens of the United States, and residing at Memphis, in the county of Shelby and State of Tennessee, have invented certain new and useful Improvements in Resilient Tires, of which the following is a specification.

This invention relates to resilient tires designed to replace the ordinary type of pneumatic tires now commonly used on motor vehicle wheels and an object of the invention is to provide a resilient tire structure which is simple in constructions, durable, may be manufactured for a relatively small cost and one which will eliminate many of the inconveniences contingent with the use of ordinary pneumatic tires, such as blow outs, punctures, rim-cuts, or the like.

More specifically, the invention comprehends the provision of a resilient tire structure comprising an outer casing having a plurality of webs or ribs extending inwardly from the inner tread portion of the casing, and inwardly extending corrugations formed in the inner surface of the tire along the bead portions thereof, between which tapered ribs and corrugations the coils of a coil spring rests, which spring is, in connection with the resilient casing provided for absorbing shocks incident to the travel of a wheel upon which the improved resilient tire is mounted.

Other objects of the invention will appear in the following detailed description, taken in connection with the accompanying drawing, forming a part of this specification, and in which drawing:—

Figure 1:
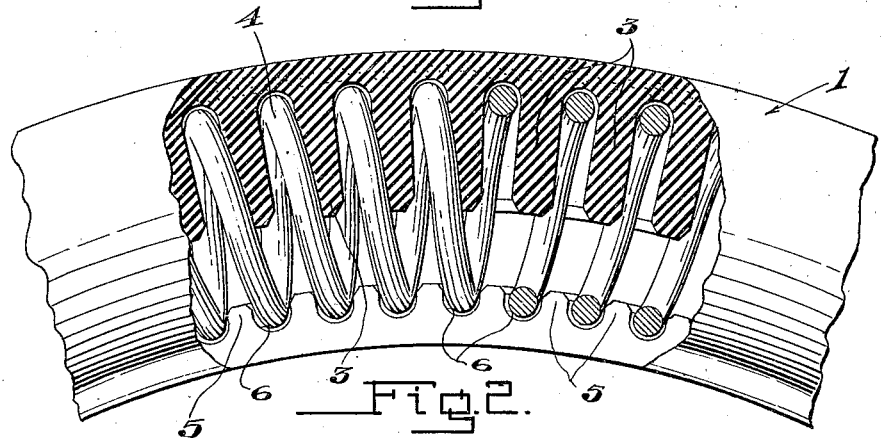
Figure 1 is a fragmentary side elevation of a tire having parts thereof broken away to expose portions of the casing and spring construction.

Referring more particularly to the drawing, 1 indicates the casing of the resilient tire structure, which casing may be made up in the same manner as ordinary tire shoes or casings are now constructed, being formed of laminated layers of fabric and rubber.

The casing 1 is provided with the usual type of beads 2 by means of which it may be attached to an ordinary type of demountable rim structure commonly employed upon motor vehicle wheels. The casing 1 is provided with a plurality of ribs 3 formed integrally therewith which ribs extend inwardly toward the central axis of the casing from the inner tread surface thereof as clearly shown in Figs. 1 and 2 of the drawings. The ribs 3 are spaced from each other and shaped to engage one upon each side of the coils of a spring 4 which is positioned within the casing 1. The spring 4 is constructed of suitable spring steel and is preferably endless having its ends welded or otherwise suitably connected to form a continuous length of resilient coil spring about the entire circumference of the tire. The inner surface of the shoe or casing 1 is provided with inwardly extending corrugations 5, which are formed upon the casing inwardly of the beads 2 thereof, forming between adjacent pairs of the corrugations pockets or seats for the innermost portions of the coils of the spring 4.

Upon compression of any portion of the casing 1, of the resilient tire structure, the inwardly extending ribs 3 will brace this said portion preventing it being ruptured or broken at the spaces between the coils of the spring 4 and these ribs will also co-act with the coils of the spring in absorbing shocks incident to the travel of the tire, the said coils adapted to be displaced circumferentially of the tire as well as laterally thereof for a limited distance.

Figure 2:
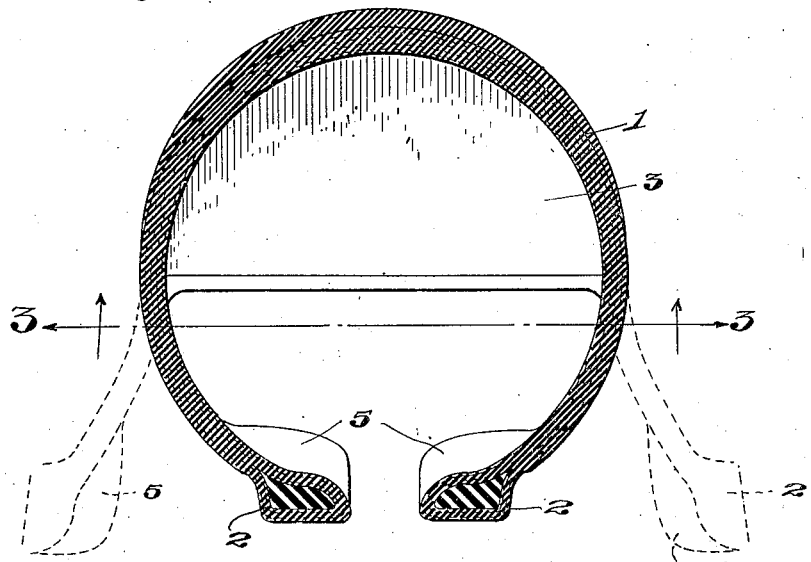
Fig. 2 is a transverse section through the tire.
Figure 3:
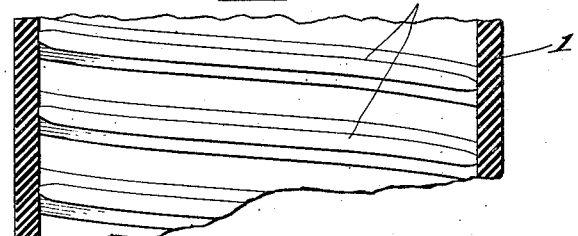
Fig. 3 is a section on the line 3—3 taken in the direction indicated by the arrows.

The casing 1 may be spread, below or inwardly of the inner edges of the ribs 3, as indicated in dotted lines in Fig. 2 of the drawing, to permit the placing of the spiral spring 4 therein, or the removal of the spring when the casing is worn to such an extent as to be rendered useless, to permit the spring to be placed within a new casing.

Changes in details may be made without departing from the spirit of this invention, but;

We claim:

1. A resilient tire comprising a casing, a plurality of resilient ribs extending inwardly from the inner surface of the tread portion of said casing to substantially the center of the tire casing, said tire casing provided with beads along its free edges and having grooves arranged in radial alinement with the ribs formed inwardly of the beads, and an endless spiral spring formed from a cylindrical spring wire within said casing having its coils engaging between the adjacent ribs and within the adjacent grooves of the casing.

2. A resilient tire comprising a casing, a plurality of resilient ribs extending inwardly from the inner surface of the tread portion of the casing to substantially the center of the casing and a spiral spring within the casing, having its convolutions engaging between the adjacent ribs.

EMORY J. BENEDICT.
MOLLIE C. FROST.